United States Patent [19]

Reininger et al.

[11] Patent Number: 4,572,619
[45] Date of Patent: Feb. 25, 1986

[54] ELECTRICALLY DIMMABLE REAR-VIEW MIRROR FOR MOTOR VEHICLES

[75] Inventors: Siegfried Reininger, Deizisau; Albert Wiesmeier, Esslingen, both of Fed. Rep. of Germany

[73] Assignee: Daimler-Benz Aktiengesellschaft, Fed. Rep. of Germany

[21] Appl. No.: 574,084

[22] Filed: Jan. 26, 1984

[30] Foreign Application Priority Data

Jan. 27, 1983 [DE] Fed. Rep. of Germany ....... 3302630

[51] Int. Cl.⁴ .......................... G02F 1/055; G02B 5/08
[52] U.S. Cl. .................................... 350/392; 350/399; 350/403; 350/279
[58] Field of Search ............... 350/392, 399, 400, 403, 350/406, 280, 281, 278, 279, 374, 384, 388, 389, 354, 356

[56] References Cited

U.S. PATENT DOCUMENTS 3,960,438  6/1976  Bonne et al. .................. 350/403
4,201,450  5/1980  Trapani ......................... 350/399
4,396,252  8/1983  Turner ........................... 350/356

FOREIGN PATENT DOCUMENTS 0067335  12/1982  European Pat. Off. ............ 350/279
0070034  1/1983   European Pat. Off. ............ 350/278
2808260  8/1979   Fed. Rep. of Germany ...... 350/278
2288363  5/1976   France ............................. 350/392

Primary Examiner—John K. Corbin
Assistant Examiner—Bruce S. Shapiro
Attorney, Agent, or Firm—Craig and Burns

[57] ABSTRACT

An electrically dimmable rear-view mirror for motor vehicles of simple and robust construction, suitable for use as an outside mirror or as an interior mirror possessing a transmission layer which is composed of a PLZT ceramic, on which a linear birefringence can be imposed by means of a controlling electric field. The transmission layer is located between a linear polarizer and a reflective layer, the latter being designed as a dielectric multilayer arrangement. Suitable comb-type electrodes are located on that side of the reflective layer which faces away from the transmission layer and, if appropriate, on that side of the polarizer which faces the transmission layer, the function of these comb-type electrodes being to generate the controlling field. The polarizer defines the direction of polarization, which is inclined at 45° with respect to the field direction and/or the optical axis of the transmission layer. The strength of the electric field controlling the dimming effect is regulated in a manner such that the effective reflectivity of the rear-view mirror is reduced to suit the prevailing situation, this field-strength regulation being accomplished by a photoelectric control system which reacts, on the one hand, to the brightness of the surroundings and, on the other hand, to the intensity of a luminous flux passing through the polarizer and the transmission layer.

13 Claims, 4 Drawing Figures

ELECTRICALLY DIMMABLE REAR-VIEW MIRROR FOR MOTOR VEHICLES

The invention relates to an electrically dimmable rear-view mirror for motor vehicles, which may for example possess a reflective layer, in front of which, seen in the propagation direction of the incident light, a transmission layer is located, this latter layer being composed of a ceramic material exhibiting an electro-optical effect which is triggerable by an electric field and which is capable of influencing the effective reflectivity of the rear-view mirror, and possessing, on at least one side of the transmission layer, electrodes which are capable of generating, as a result of the application of a voltage to them, the electric field which is appropriate for triggering the electro-optical effect, which electrodes are spaced one from another, and possessing at least one linear polarizer which, seen in the incidence direction of the light, is located in front of the transmission layer.

A rear-view mirror of the above-mentioned type is disclosed in German Offenlegungsschrift No. 2,808,260.

In the case of the known rear-view mirror, a ceramic material is provided as the transmission layer, this material being optically anisotropic in the direction looking perpendicularly towards the transmission layer, that is to say, for example, a material exhibiting an optical activity which rotates the plane of vibration of linearly polarized light, the thickness of the layer of this material being adjusted to a value such that the plane of vibration of linearly polarized light is rotated through 90° as the light passes through the transmission layer. This transmission layer is located between linear polarizers, their directions of polarization running at right-angles to each other. Their optical anisotropy can be annulled by applying an electric field running normal to the transmission layer.

If no field is present, the assembly comprising the polarizers and the transmission layer is transparent, so that light strikes a reflective layer through this layer arrangement, this reflective layer, a conventional metallic mirror being located, seen in the direction in which the light is incident, behind this layer arrangement, and is back-reflected by this mirror, in the reflection direction, and can pass, once again, through the assembly comprising the polarizers and the transmission layer If the transverse electric field is applied, the optical anisotropy of the transmission layer will be partially annulled, or completely annulled depending on the strength of the field, and the transparency of the arrangement comprising the polarizers and the transmission layer will accordingly be annulled, either partially or completely.

This known rear-view mirror is, at the minimum, subject to the following disadvantages.

In order to apply the transverse electric field, large area transparent electrodes must be provided, the manufacture of which is technically complicated and, in consequence, expensive. With these electrodes incorporated into it, the multilayer arrangement possesses a large number of interfaces at which reflections can occur, with the result that, of the total reflected luminous flux, a large proportion is represented by light which has not been subjected to the electrically controllable intensity-modulation process. As a result, the effective reflectivity of the known mirror is only somewhat decreased, that is to say altered by a factor of, at the most, 1/5, which cannot be regarded as sufficient for effective dimming. Admittedly, this functional disadvantage of the known rear-view mirror could be compensated, at least partially, by providing antireflection coatings possessing suitably graded refractive indices, at the interfaces between media possessing different refractive indices, but such a procedure would, owing to the large number of interfaces which are present, result in an extremely complicated structure overall.

The object of the invention is accordingly to provide an electrically dimmable rear-view mirror, of the type initially mentioned, which brings about modulation of the effective reflectivity to an extent which is adequate in the sense of effective dimming, while at the same time having a markedly less complicated structure.

This object is achieved, according to the invention, by means of the features which are characterized in that the ceramic material which is selected for the transmission layer is of a nature such that, seen in the propagation direction of the light, linear birefringence can be imposed on it by applying an electric field parallel to the layer, and in that the reflective layer is designed as a dielectric multilayer arrangement, electrodes for generating the electric field which brings about the linear birefringence of the transmission layer being located on that side of the multilayer arrangement which faces away from the transmission layer.

In accordance with these features, the transmission layer is composed of a ceramic material, on which a linear birefringence can be imposed by applying a longitudinal electric field which acts at right-angles to the optic axis, this axis being defined by the field direction as will become apparent from the explanation which follows. The reflective layer is designed as an electrically insulating, dielectric, multilayer, the electrodes for generating the longitudinal electric field being attached to that side of the dielectric multilayer which faces away from the transmission layer, there being, in the case of this arrangement, no need for these electrodes to be transparent, so that they can be designed as conventional metallic conductor tracks, which can be produced by means of commonly-used manufacturing technology.

Since the sense of the change, in which the state of polarization changes as a result of the light passing through the birefringent transmission layer, is identical before and after a reflection at the reflective layer, and, in consequence, the change in polarization which a luminous flux experiences on entering the transmission layer in the state of polarization which has been defined by the entry polarizer, is proportional, overall, to the path distance which the light has travelled in the transmission layer, the polarizer for the emergent light, acting, as it were, as an analyzer, brings about the desired attenuation of the reflected luminous flux, when its state of polarization no longer matches the state which is defined by the polarizer. The rear-view mirror according to the invention requires only a single polarizer in order to function in the intended manner, and this results in the overall construction of the mirror being advantageously simple.

It is particularly advantageous if the material forming the transmission layer is optically isotropic when no field is present, and if it is hysteresis-free, that is to say that no residual anisotropy remains once a controlling field, which was previously applied, has been switched off The mirror then remains serviceable, even in the event of a failure of the electrical power supply, but may no longer be dimmed.

It is a further object of the invention to provide an electrically dimmable rear-view mirror with a transmission layer material which is very highly suitable in the sense explained above.

It is a further object of the invention to provide an electrically dimmable rear-view mirror wherein that proportion of the light in the luminous flux reflected, as a whole, by the mirror, which is not subjected to the electrically controllable intensity-modulation process can be kept to a favorably low level by means of the antireflection coatings. An antireflection coating is provided on at least that side of the transmission layer on which the light is incident, this antireflection coating reducing the reflectivity of the transmission layer.

It is another object of the invention to provide an electrically dimmable rear-view mirror wherein an antireflection coating is provided on at least that side of the polarizer on which the light is incident.

It is another object of the invention to provide an electrically dimmable rear-view mirror wherein the symmetrical arrangement of the control electrodes in relation to the longitudinal mid-plane of the transmission layer and electrodes for generating the electric field which brings about the linear birefringence of the ceramic material of the transmission layer are also provided on that side of this layer which faces the reflective layer, these electrodes being composed of a transparent material so that the concentration of the lines of flux of the controlling electric field is very high in the interior of the transmission layer, and wherein the effective controlling field is virtually homogeneous, from which there results a significant advantage, namely that, compared to an arrangement whereby the control electrodes are provided only on one side, it is possible to operate with markedly lower control voltages, or a larger electrode separation can be selected, which again has a beneficial effect on the homogeneity of the field.

If the transmission-layer material is piezoelectric, and accordingly experiences dilation or compression under the action of a controlling electric field, there is a danger, in the course of time, of the control electrodes parting, these electrodes being applied to the transmission layer as thin vapor-deposited coatings, in the form of narrow strips, as a result of which the proper functioning of the rear-view mirror would be considerably impaired.

It is a further object of the invention to provide an electrically dimmable rear-view mirror wherein, for example, the transparent control electrodes which are provided on that side of the mirror at which the light enters, are located on the polarizer which is adjacent to the transmission layer such that electrodes which are located on that side of a transmission layer which faces a reflective layer are designed as vapor-deposited strip electrodes, applied to a polarizer, and are thereby mechanically decoupled from the transmission layer. The electrodes are then considerably more effectively protected from damage.

Yet another object of the invention is to provide an electrically dimmable rear-view mirror wherein electrodes which are located on that side of a reflective layer which faces away from the transmission layer are designed as conductor wires, possessing a thickness of 40 to 60 $\mu$m and are embedded, on one side, into an insulating plastic carrier-layer, the control electrodes, composed of metal which are located on that side of the reflective layer which faces away from the transmission layer, and assume the form of wires, of particularly high mechanical stability, the shaping of these electrodes being such that the wires forming the electrodes are flattened on their side facing the reflective layer, and rest flat against this layer, to aid their correct positioning.

It is a further object of the invention to provide an electrically dimmable rear-view mirror wherein a (PLZT) transmission layer is between 200 $\mu$m and 600 $\mu$m thick, in that the distances between successive electrodes, measured in the field direction, range from 400 $\mu$m to 600 $\mu$m, and wherein a voltage can be applied between each two successive electrodes of a magnitude ranging from 250 V to 500 V, for which practical tests have shown to be particularly expedient.

It is another object of the invention to provide an electrically dimmable rear-view mirror wherein a reflective layer possesses a transmission window, through which a luminous flux, passing through the transmission layer can emerge, and a polarizer is provided in the propagation direction of this emergent luminous flux, the orientation of this polarizer coinciding with that of an entry polarizer, a light sensor being provided for receiving the luminous flux emerging from the second polarizer, the light sensor generating a voltage output signal which increases monotonically with the intensity of the emergent luminous flux from this second polarizer, this voltage output signal being utilized for activating a control-voltage source which outputs a voltage which, in its turn, increases monotonically with the output voltage from the light sensor and can be utilized for generating the electric field which brings about the birefringence of the transmission layer.

It is another object of the invention to provide an electrically dimmable rear-view mirror such as that immediately previously set forth wherein a second light sensor is provided, which reacts to the brightness of the surroundings and generates an output signal which increases monotonically as the brightness of the surroundings decreases, this output signal being utilized for controlling the sensitivity of the first light sensor in a manner such that its output signal increases monotonically with the output signal from the second light sensor.

It is a further object of the invention to provide an electrically dimmable rear-view mirror which simple and robust construction, and is accordingly equally suitable as either an interior mirror or as an outside mirror. Its effective reflectivity can be set or, as the case may be, regulated, in an infinitely variable manner and over a wide range, in a monotonic relationship with the control voltage.

These and other objects, features, and advantages of the present invention will become more apparent from the following description when taken in connection with the accompanying drawings which show, for the purposes of illustration only, plural embodiments in accordance with the present invention, and wherein:

FIG. 1 shows the basic construction of an electrically dimmable rear-view mirror according to the invention, in a simplified sectional representation along a plane lying perpendicular to the reflecting surface and in the direction of a controlling electric field, in conjunction with a representation of a photoelectric control system which is provided for the purpose of automatically adjusting the effective reflectivity of the mirror.

Figure 1:
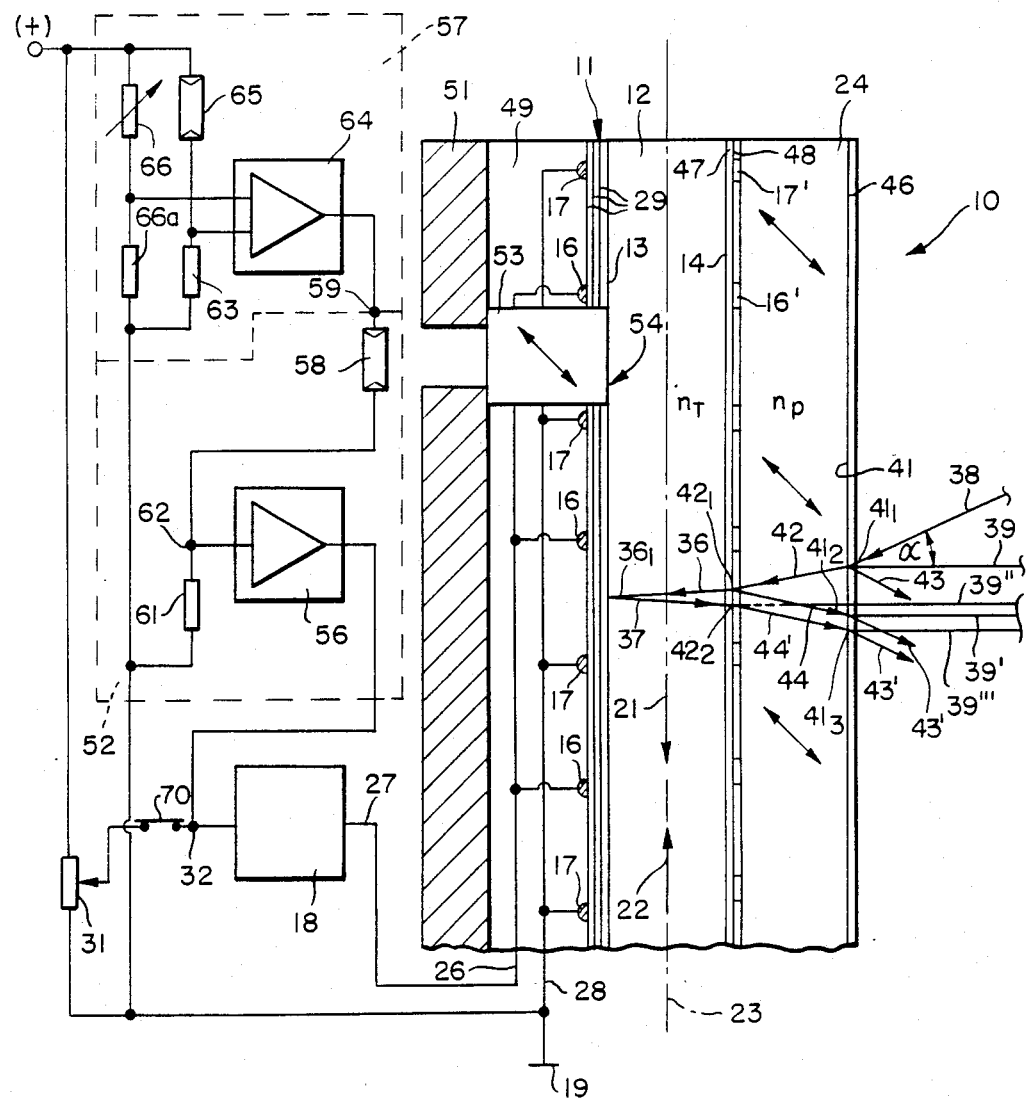

Referring now to the drawings wherein like reference numerals represent like elements, and more particularly to FIG. 1, the rear-view mirror 10 according to the invention is designed as a rear-surface mirror, in the case of which the light reflected at the reflective layer 11 passes twice through a transmission layer 12 which, seen in the incidence direction, is located in front of the reflective layer 11, or as the case may be, in front of the reflecting surface of the rear-view mirror 10.

This transmission layer 12 is composed of a solid material which exhibits an electro-optical effect, which manifests itself by the appearance, when the influence of an electric field is present, of a linear birefringence which itself depends on the field, meaning that when an electric field is applied, the refractive index of this material, for light which is polarized parallel to the field direction assumes a value which differs from that for light which is polarized perpendicularly to the field direction.

This electro-optical effect is exploited, in a manner which will be explained in still greater detail below, in order to influence the effective reflectivity of the rear-view mirror 10 as a function of the intensity of the light striking it.

For this purpose, electrodes 16 and 17 are located on at least one side of the transmission layer 12, which may be assumed to be a plate possessing plan-parallel bounding surfaces 13 and 14, these electrodes, 16 and 17, being positioned in the immediate vicinity thereof, and being capable of generating electric fields running in the direction of the arrows 21 and 22 representing them, as a result of applying the output voltage from a suitable control-voltage source 18 to alternate electrodes 16, and of connecting alternate electrodes 17 to the vehicle ground structure 19.

The optical isotropy of the transmission layer 12 is annulled, in the direction perpendicular to the electric fields 21 and 22, by the essential components of these fields which, running parallel to the surfaces, 13 and 14, bounding the transmission layer 12, and to its longitudinal mid-plane 23, alternately point in opposite directions, this isotropy-annulment tending to bring about a linear birefringence.

A material which, within the makeup of the rear-view mirror 10, is suitable for use as the transmission layer 12, is a transparent lead-lanthanum-zirconium/-titanate (PLZT) ceramic, which develops a linear birefringence, as an electrooptical effect, when an electric field 21 and 22 is applied, this birefringence being perpendicular to the electric field.

A linear polarizer 24 is located on the light incidence side of the transmission layer 12 and presents a face toward the reflective layer 11, the polarization direction of this polarizer 24, seen in the direction normal to the plane of reflection of the reflective layer 11, being at an angle of 45° with respect to the direction of the electrical fields, 21 and 22, which can be applied to the transmission layer 12.

The reflective layer 11 of the rear-view mirror 10 is designed as a dielectric multilayer arrangement possessing a structure which is known per se, this arrangement comprising a plurality of thin layers composed of electrically insulating, dielectric materials, possessing, in alternation, high and low refractive indices which are suitably graded, the overall result of which is to ensure that the reflective layer 11 possesses a very high reflectivity.

Figure 2:
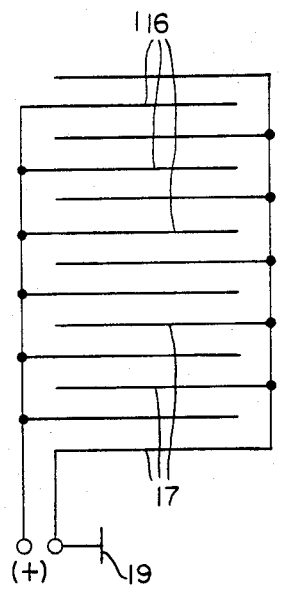
FIG. 2 shows a specific configuration of control electrodes for generating a controlling electric field which is capable of impressing, on the transmission layer of the rear-view mirror shown in FIG. 1, a birefringence which is appropriate for influencing its effective reflectivity.

The electrodes, marked 16 in the drawing, are connected, via a bus line 26, to the output terminal 27 of the control-voltage source 18. The electrodes marked 17 in the drawing are likewise co-connected to the vehicle ground 19, or to a reference-voltage pole of the control-voltage source 18, this reference-voltage pole being omitted from the drawing, connection likewise being effected via a bus line 28. As depicted in FIG. 1, the electrodes 16 and 17 run perpendicular to the plane of the drawing, parallel to one another, and are shown in FIG. 2 to be arranged in the manner of two interlocking combs, the teeth of one comb projecting into the spaces between adjacent teeth of the opposite comb, in an arrangement such that the distances between adjacent electrodes 16 and 17 are equal in all cases, and correspond to at least approximately the thickness of the transmission layer 12.

In a specific illustrative embodiment of a rear-view mirror 10, the distance between each two electrodes, 16 or 17, is 1 mm, or the distance between successive electrodes, 16 and 17, is 0.5 mm, while the transmission layer 12, which is composed of the PLZT ceramic, has a thickness of 0.4 mm. The electrodes 16 and 17, and the bus lines 26 and 28 which, in each case, interconnect them, are designed as strip electrodes, 0.1 mm wide, which are produced in the form of thin, vapor-deposited gold coatings which are deposited, to a thickness of approximately 10 $\mu$m, on that side of the reflective layer 11 which faces away from the transmission layer 12, the reflective layer 11, in its turn, possessing a total thickness of approximately 50 $\mu$m.

By suitably setting a potentiometer 31 which is connected as a voltage divider, a voltage amounting to between 0 V and 12 V, the voltage of the vehicle battery can be supplied to the input terminal 32 of the control voltage source 18, and as a result it is possible to vary the output voltage from the control-voltage source in proportion to the input voltage, over the range from 0 V to 300 V, the latter being the voltage between an electrode 16 and an adjacent electrode 17.

Figure 3:
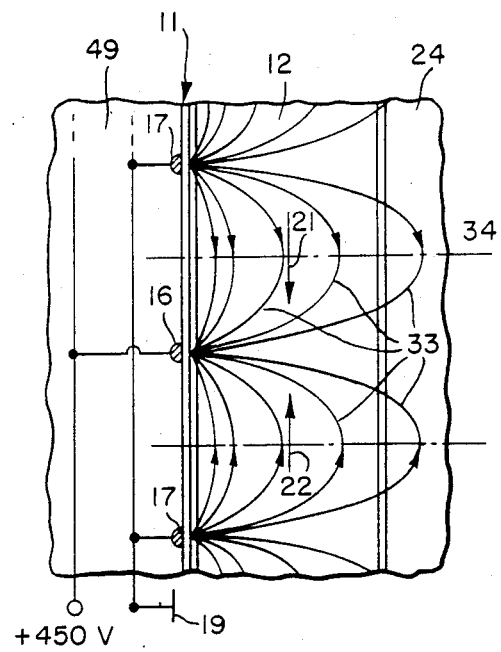
FIG. 3 shows in a qualitative manner, the shape of the lines of flux of the controlling electric field in the transmission layer when the control electrodes are located on one side, this sectional representation corresponding to that of FIG. 1.

As a consequence of the application of a positive or negative direct voltage to the electrodes 16, relative to the reference potential applied to the electrodes 17, an electric field is generated, this field passing through the transmission layer 12 and possessing lines of flux 33 with the curved shape shown qualitatively in FIG. 3. This electric field, the flux lines of which run, for the most part, perpendicular to its symmetry-planes 34, that is to say the lines run parallel to the longitudinal mid-plane 23 of the transmission layer 12, or parallel to the arrows 21 or 22, but precisely so only in these field symmetry-planes which planes run perpendicular to the longitudinal mid-plane 23 of the transmission layer 12, brings about an annulment of the optical isotropy of the PLZT ceramic material, in a manner such that this material now, under the influence of the above-mentioned electric field, develops a linear birefringence. The optic axis of the PLZT material, the direction of which is defined by the local shape of the lines 33 of electric flux, then runs essentially in the directions corresponding to the arrows, 21 and 22, marking the field direction which is predominantly effective. Light which propagates along the optic axis of the PLZT material experiences no birefringence.

The control-voltage source 18 is designed in a manner such that its maximum output voltage is sufficient for the generation, in the PLZT material, of electric fields, 21 and 22, which constrain the transmission layer 12 to act as a so-called quarter-wavelength plate ($\lambda/4$-plate) for light which is propagating inside this layer 12, perpendicular to the optic axis, or virtually perpendicular to this axis.

In order to explain the use, in accordance with its intended purpose, of the electrically dimmable rear-view mirror 10 which has been described up to this point, reference should again be made to FIG. 1, which shows, in a simplified optical path, that is to say without taking multiple reflections into account, such as could, for example, occur between the mirror layer 11 and that bounding surface 14 of the transmission layer 12 which faces it, or between the transmission layer 12 and the polarizer 24, the geometric reflection behavior of the rear-view mirror 10 for an incident luminous flux, represented by the arrow 38 in FIG. 1, propagating in a direction which, with the normal to the mirror plane at the point of incidence 39, includes the incidence angle $\alpha$.

The luminous flux 38, the intensity of which will be designated $I_4$, is split into a first partial luminous flux, represented by the arrow 42, and a second partial luminous flux, represented by the arrow 43, splitting taking place at the outer bounding surface 41 of the polarizer, shown on the right in FIG. 1, forming an interface between media possessing different refractive indices (air, possessing the refractive index $n_L = 1$, and the polarizer material, possessing the refractive index $n_P > n_L$). The first partial luminous flux 42 is produced as a result of the refraction of a portion of the incident luminous flux, which is directed, in the optically denser medium of the polarizer 24, towards the normal 39, shown as a solid line, at the point of incidence $41_1$ towards a point $42_1$ on plane-parallel boundary surface 14, while the second partial luminous flux 43 is produced by the reflection, at point $41_1$ on the interface 41, of a portion of the incident luminous flux 38.

The polarizer 24 may be assumed to be a conventional polarizing film, composed of a suitable plastic which virtually completely absorbs light which is polarized perpendicularly to the intended direction of polarization, with the result that the light which passes into the transmission layer 12, from the polarizer 24, is virtually completely polarized in the intended direction of polarization.

In the above sense, the term "completely polarized" means that the intensity $I_d$ of the luminous flux emerging from a further linear polarizer, which is used as an analyzer and which receives, as an incoming luminous flux, the luminous flux emerging from the polarizer 24, the intensity of which may be denoted by $I_a$, satisfies the relationship $$I_d = I_a \cos^2 \text{ⓗ} \quad (1)$$

ⓗ denoting the angle included between the directions of polarization of the polarizer 24 and of the further polarizer. This also means, on the other hand, that the intensity of the luminous flux 42 immediately in front of the interface 14 is now only approximately half the intensity which it possessed on entering the polarizer 24 at point $41_1$.

Since the refractive index $n_T$ of the PLZT transmission layer 12 ($n_T \approx 2.5$) is, as a rule, markedly greater than the refractive index $n_P$ of the polarizer material, splitting of the luminous flux 42 once again occurs at point $42_1$, as already explained by reference to the luminous flux 38, at the interface 14 between the polarizer 24 and the transmission layer 12, this luminous flux 42 being split into a first partial luminous flux which propagates, in the transmission layer 12, in the direction indicated by the arrow 36, and into a second partial luminous flux 44 which is produced by the geometric reflection of a portion of the polarized partial luminous flux 42 at point $42_1$, on the interface 14. This second partial luminous flux 44, which possesses the polarization defined by the polarizer 24, is, on emerging at point $41_2$ at its boundary surface 41, that is to say on passing from a medium 24 which has a comparatively high optical density and entering a medium which is optically less dense, namely air, is refracted away from the normal 39' shown as a dashed line, at the point of incidence $41_2$, and is directed into a direction 43' parallel to that in which the unpolarized partial luminous flux 43 is propagating after having been produced by reflection at the bounding surface 41, in which direction the driver sees the image of an object which is present in the space to the rear of the vehicle.

The partial luminous flux which is represented by the arrow 36, and which enters the transmission layer 12 in the state of linear polarization defined by the polarizer 24, and in which state, for the realistic values specified, by way of example, for the refractive indices $n_P$ and $n_T$ of the polarizer 24 and of the transmission layer 12, as well as under the reflection conditions represented in FIG. 1, which are likewise realistic (incidence angle 20°), strikes the reflective layer 11 virtually perpendicularly at point 36, and is virtually completely reflected at this layer. The luminous flux resulting from this reflection at 36, represented by the arrow 37, is refracted away from the normal 39'', shown as a dashed line, at the point of incidence, $42_2$, passing through polarizer 24 to be again refracted at point $41_3$ from the normal 39''', shown as a dashed line and perpendicular to the mirror plane. Thus partial fluxes 44 and 44' originating by reflection respectively at points $42_1$, and $42_2$ and parallel, as are partial fluxes 43, 43' and 43'' are emitted from the polarizer 24 refracted at points $41_1$, $41_2$ and $41_3$, respectively.

As long as the optical isotropy of the transmission layer has not been disturbed by the application of an electric field 21, 22, the reflected luminous flux 37 possesses the linear state of polarization which is defined by the polarizer 24 and, seen in the reflection direction, can pass through this polarizer 24. In this case, the rearview mirror 10 possesses its maximum effective reflectivity, and the brightness of the image field which the driver can view in the rear-view mirror assumes its maximum value.

It should be noted that, owing to the splitting of the primary incident luminous flux 38 into at least three luminous fluxes, 43, 44 and 37, which propagate in the reflection direction, the driver could see three images of the space to the rear of the vehicle if these three luminous fluxes were to be sufficiently displaced one from another. However, if the prescribed layer-thicknesses are adopted for the polarizer 24 and for the transmission layer 12, 0.5 mm and 0.4 mm respectively, and if conventional angles of incidence and reflection apply, these luminous fluxes are displaced, one from another, so little that the driver cannot resolve these three images, and sees only a single image which is adequately sharp, and to which the individual luminous fluxes supply differing brightness contributions, the contribution supplied by the luminous flux 37 exceeding the sum of the contributions from the luminous fluxes 43 and 44, provided that the transmission layer 12 is in its optically isotropic state.

In order to reduce the effective reflectivity of the rear-view mirror 10, for the purpose of dimming the mirror 10, it is possible to cause the control voltage source 18 to output a suitable control voltage to the electrodes 16, this being effected, for example, by manual adjustment of the potentiometer 31, or by operating a switch 70, as a result of which the electric fields 21 and 22 are produced, which cause the optical isotropy of the PLZT material of the transmission layer 12 to be annulled, the direction of these fields, 21 and 22, also determining the direction of the optic axis of the PLZT material, which has now, in response to the fields, become birefringent.

Since the plane of polarization of the luminous flux 36 which enters the transmission layer 12 and, initially, is virtually completely linearly polarized, extends at an angle of 45° to the optical axis of the transmission layer 12, which axis is defined by the electric field 21, 22, this luminous flux 36, regarded as an electromagnetic wave, can be regarded, in accordance with the superposition principle, as resulting from two electromagnetic component waves possessing the same amplitude, one of these component waves vibrating, or being polarized, parallel to the optic axis of the PLZT material, and the other component wave vibrating, or being polarized, perpendicular to this axis. Since, owing to the field-induced linear birefringence of the transmission layer 12, its refractive indices, $n_1$ and $n_2$, for the component waves which are polarized parallel to and, as the case may be, perpendicular to the optic axis are different, a phase difference occurs between these component waves, this phase difference increasing in the direction looking along their optical path, in accordance with the relationship $$\Delta = 2\pi/\lambda \cdot x \cdot (n_1 - n_2) \tag{2}$$

where $\lambda$ denotes the wavelength of the light, and $x$ denotes the geometric length of the path travelled by the light in the PLZT material and $X \cdot (n_1 - n_2) = \Lambda =$ relative optical path length (ROPL).

If the phase difference $\Delta$, given by the relationship (2), amounts to $\pi/2$ after a particular $(ROPL) = \Lambda_4 2 x \cdot \Lambda/4$, the so-called quarter-wavelength distance, the luminous flux 36 resulting from the two phase-shifted component waves is circularly polarized and, after having travelled the double, (ROPL), $2\Lambda_4 = \Lambda_2$ the so-called half wavelength distance, and the phase difference $\Delta$ has increased to the value $\pi$, it is linearly polarized again, but the plane of polarization of the state of linear polarization which has now been achieved is rotated through 90° relative to the original direction of polarization with which the luminous flux 36 entered the transmission layer 12.

This means that the greatest possible reduction in the effective reflectivity of the rear-view mirror 10 is obtained when its transmission layer 12, under the influence of the applied electric field 21, 22, possesses precisely the $\Lambda_4$ thickness for the luminous flux 36 which is propagating towards the reflective layer 11, and which is initially linearly polarized, i.e., this luminous flux 36 is circularly polarzed on striking the reflective layer 11, and, conversely, when the thickness of the transmission layer 12, for the luminous flux 36, 37 which is propagating towards the reflective layer 11 and back, from this layer 11, to the polarizer 24, totals $\Lambda_2$, the result is that the luminous flux 37 is then unable to pass through the polarizer 24. In order to generate the strength of the electric field 21, 22 required for this purpose, the potential difference between the electrodes 16 and 17 must then be approximately to 300 V. The intensity of the luminous flux 37 which re-emerges from the polarizer 24 after having passed twice through the transmission layer 12 can be varied, if regarded in isolation, by varying the control voltage which can be applied to the electrodes 16, variation by a factor of $10^4$ being possible.

Dielectric antireflection coatings 46 and 47 are provided on the outer bounding surface 41 of the polarizer 24 and on the bounding surface 14 facing the polarizer, it being possible to apply these coatings, to the polarizer 24, and/or to the transmission layer 12, by means of known vapordeposition processes, the function of these coatings being to minimize the contribution, to the total luminous flux 43, 44 and 37 which is perceived in its entirety by the observer and which determines the brightness of the image, from the reflected luminous fluxes, 43 and 44, resulting from reflection towards the observer at the above-mentioned bounding surfaces 41 and 14, the purpose of minimizing the reflection contribution being to obtain an ability to modulate the effective reflectivity of the rear-view mirror 10 over a wide range.

By using dielectric antireflection coatings 46 and 47, of the above-mentioned nature, which typically have a thickness of approximately 10 $\mu$m, it is possible to reduce the reflectivity of the mirror 10 for the reflected luminous fluxes, 43 and 44, which cannot be subjected to electrooptical modulation, by a factor of approximately 1/10, and hence to obtain an ability to modulate the effective reflectivity of the rear-view mirror 10 by a factor of approximately 1/25.

Insofar as the rear-view mirror 10 according to the invention is concerned, a PLZT ceramic is used for the transmission layer 12 of the mirror, this ceramic exhibiting a quadratic electro-optical effect and accordingly being optically isotropic if no field is present (in contrast to a PLZT ceramic exhibiting a linear electro-optical effect, such a ceramic requiring a compensating field in order to suppress its intrinsic birefringence). The nature of the usable electro-optical effect can be determined by the chemical composition of the PLZT ceramic. Moreover, in the case of PLZT ceramics which exhibit a quadratic electro-optical effect, comparatively low field strengths are sufficient for obtaining a particular birefringence.

Figure 4:
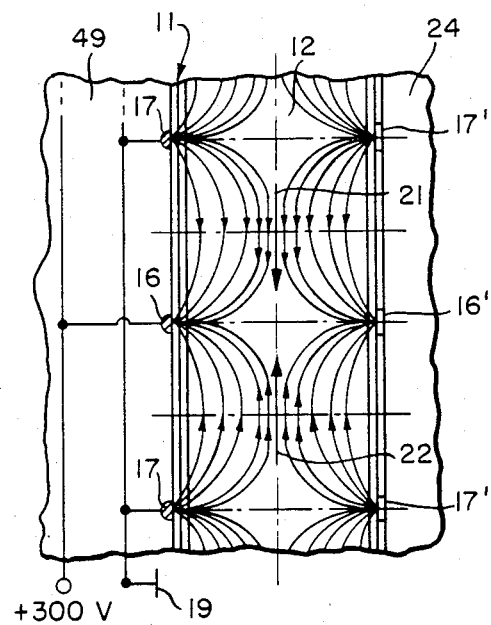
FIG. 4 shows, in a qualitative manner, the shape of the controlling electric field in the transmission layer, for the case involving the provision of a control electrode arrangement which is symmetrical with respect to the longitudinal mid-plane of the transmission layer.

Furthermore, in order to achieve substantially homogeneous electric fields 21, 22, with high field strengths, it is advantageous when, as illustrated in FIGS. 1 and 4, electrodes 16' and 17' are also provided on that side of the transmission layer 12 which faces the reflective layer 11, these electrodes 16' and 17' corresponding to the electrodes 16 and 17, and being arranged symmetrically with respect to them, relative to the longitudinal mid-plane 23 of the transmission layer 12, as a result of which arrangement it is possible to obtain electric fields 21 and 22 characterized by flux lines possessing the shape which is reproduced qualitatively in FIG. 4. Compared to an arrangement of the control electrodes 16 and 17 which is only single-sided, the double-sided arrangement permits operation with markedly lower control voltages. However, the electrodes 16' and 17' must be composed of a transparent material, and can assume the form of strip-shaped coatings of vapor-deposited $SnO_2$. At the same time, it can be expedient if the electrodes 16' and 17' are embedded into a smooth coating 48 which is vapor-deposited onto the polarizer 24, and which can be utilized, in its turn, as an antireflection coating. In this case, these electrodes, 16' and 17' are also prevented, in a reliable manner, from being subjected to mechanical stresses arising from any piezoelectric behavior of the PLZT material, as a result of which they could be damaged. For this reason it can be expedient, too, if the electrodes 16 and 17 which are arranged on that side of the reflective layer 11 which faces away from the transmission layer 12 are designed as gold wires, approximately 50 μm thick, which are embedded into an insulating plastic layer 49 serving as a means for fixing the functional elements of the rearview mirror 10, which have already been described in great detail, to a backing plate 51.

An electronic control system is provided for automatically adjusting the effective reflectivity of the rearview mirror 10 to values at which there is no danger of dazzling the driver, this control system embodying a first light-sensing unit 52 which receives incident light from the zone to the rear of the vehicle, viewable by means of the rear-view mirror 10, this incident light, before striking the light sensor 52, passing through the polarizer 24, the transmission layer 12, and a further polarizer 53 which is used as an analyzer, with its polarization direction coinciding with that of the entry polarizer 24. The further polarizer 53 is installed within the area of a window 54 which is cut in the reflective layer 11, thus enabling light which emerges from the transmission layer 12 to enter the polarizer 53 directly. If an intense luminous flux strikes the light sensor 52 at photoresistor 58, such as, for example, light from the headlights of a vehicle approaching from the rear, which could dazzle the driver, the light sensor 52 emits an appropriately increased output voltage. The voltage from an output amplifier 56 of the light-sensing unit 52, which is proportional to this luminous flux, is employed to trigger the control voltage source 18, via 27, to emit a suitable output voltage, which is supplied to the electrodes 16 and, if they are provided, to the electrodes 16', as a result of which the transmission layer 12 is directed to assume its birefringent state. Since this causes an attenuation of the luminous flux which is emerging from the further polarizer 53, and which is received by the light sensor 52, leading, in turn, to the output voltage from the control voltage source 18 decreasing again, the result is the establishment of an equilibrium condition corresponding to a reduced effective reflectivity of the rear-view mirror 10.

The darker the surroundings of the vehicle become, the higher should be the output voltage which is emitted by the light sensor 52 and, as a result, the reduction in the reflectivity of the rear-view mirror 10 should become correspondingly more pronounced. In order to achieve this effect, an additional light sensor 57 is provided, which reacts to the brightness of the surroundings, and which emits an output voltage which varies inversely with the brightness of the vehicle's surroundings. The output voltage from this second light sensor 57 is input, as a supply voltage, to the first light sensor 52, which is designed in a manner such that its output voltage increases with the supply voltage.

In the case of the specific illustrative embodiment shown in the figures, the two light sensors 52 and 57 are implemented as follows.

The first light sensor 52 incorporates a photoresistor 58, its resistance varying inversely with the intensity of the light striking it. It is connected, on one side, to the output terminal 59 of the second light sensor 57, which is utilized as a voltage source, and, on the other side, to the vehicle ground 19, via a resistor 61. The center tapping 62 of the voltage divider formed by the photoresistor 58 and the fixed resistor 61 is connected to the input terminal of the output amplifier 56 of the light sensor 52, the output voltage from which is employed to trigger the control voltage source 18.

The second light sensor 57 likewise incorporates a photoresistor 65, as a photosensitive element, the resistance of which varies inversely with the brightness of the surroundings.

On one side, this photoresistor 65 is connected to the positive pole of the supply voltage source and, on the other side, to the vehicle ground, via a fixed resistor 63. The center tapping of the voltage divider formed by the photoresistor 65 and the fixed resistor 63 is connected to the negative input terminal of a differential amplifier 64. The positive input terminal of this differential amplifier 64 is connected to the center tapping of a further voltage divider 66, 66a which is connected between the positive pole of the supply voltage source and the vehicle ground 19, and which incorporates an adjustable resistor 66 enabling, in effect, a threshold value for the brightness of the surroundings to be set, such that the differential amplifier 64 starts to operate when the brightness of the surroundsings falls below the set value, generating an output signal in the form of a voltage, the level of which varies inversely with the brightness of the surroundings.

In a useful modification of the control system, a PLZT platelet can be installed between the further polarizer 53 and the window 54 in the reflective layer 11, this platlet, which can likewise be subjected to the controlling field 21, 22, doubling the thickness of the transmission layer 12 at this point. This arrangement enables greater shifts in the intensity of the light striking the photoresistor 58 to be obtained.

It is self-explanatory that it is also possible to obtain a luminous flux through the sensor, suitable for controlling the effective reflectivity of the rear-view mirror 10, by ranching it off from the reflected luminous flux, using a semi-transparent mirror for this purpose.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An electrically dimmable rear-view mirror comprising:

a linear polarizing means with a transmission axis receiving incident light for generating a light output, a transmission layer means for receiving at least a portion of light output from the linear polarizing means to transmit a portion of the light received thereby and including a ceramic means exhibiting an electro-optical effect in response to an electric field for controlling the effective reflectivity of the rear-view mirror, a reflecting layer means including at least a multilayer dielectric arrangement receiving light output from the transmission layer means, spaced electrode means disposed on at least one side of the transmission layer means for generating an electric field substantially parallel to the transmission layer means in response to a voltage applied to the electrode means to provide a linear birefringence in the transmission layer, a transmission window means in the reflecting layer means for transmitting a luminous flux from the transmission layer, a second polarizer for receiving said transmitted luminous flux, the transmission axis of the second polarizer coinciding with that of the linear polarizer, a light sensor means receiving the transmitted luminous flux from the second polarizer for generating a voltage output signal which increases monotonically with the intensity of the transmitted luminous flux from the second polarizer, a control voltage source responsive to the voltage output signal to produce a voltage which, in its turn, increases monotonically with the output voltage from the light sensor means for generating the electric field which effects the linear birefringence of the transmission layer.

2. An electrically dimmable rear-view mirror according to claim 1, wherein
the transmission layer means is optically isotropic if no field is present.

3. An electrically dimmable rear-view mirror according to claim 1, wherein
the transmission layer means is composed of a lead-lanthanum zirconate/titanate (PLZT) ceramic material which exhibits a quadratic electro-optic effect.

4. An electrically dimmable rear-view mirror according to claim 3, wherein the (PLZT) transmission layer means is between 200 μm and 600 μm thick,
the distance between successive electrodes measured in the direction parallel to the transmission layer means ranges from 400 μm to 600 μm, and
the voltage applied between each two successive electrodes has a magnitude ranging from 250 V to 500 V.

5. An electrically dimmable rear-view mirror according to claim 3, wherein at least a portion of said electrode means comprises a transparent material and is disposed on that side of the transmission layer contiguous to the reflective layer.

6. An electrically dimmable rear-view mirror according to claim 5, wherein at least a portion of the electrode means comprises
vapor-deposited strip electrodes applied to the polarizing means located on that side of the transmission layer means which faces and is remote from the reflective layer.

7. An electrically dimmable rear-view mirror according to claim 5, wherein
the (PLZT) transmission layer means is between 200 μm and 600 μm thick,
the distance between successive electrodes, measured in the field direction, ranging from 400 μm to 600 μm, and
the voltage applied between each two successive electrodes has a magnitude ranging from 250 V to 500 V.

8. An electrically dimmable rear-view mirror according to claim 1, further comprising
an antireflection coating means provided on at least the side of the transmission layer means on which the light is incident from the linear polarizing means, for reducing the reflectivity of the transmission layer means.

9. An electrically dimmable rear-view mirror according to claim 1, further comprising
an antireflection coating provided on at least that side of the linear polarizing means on which the light is incident.

10. An electrically dimmable rear-view mirror according to claim 1, further comprising
an insulating plastic carrier-layer, and wherein
the electrode means comprise at least one conductor wire of diameter of 40 to 60 μm embedded, on one side, into the insulating plastic carrier-layer and disposed on a side of the reflective layer means remote from the transmission layer means.

11. An electrically dimmable rear-view mirror according to claim 1, further comprising
an insulating plastic carrier-layer, and wherein
the electrode means comprise at least one conductor wire of diameter 40 to 60 μm embedded in the insulating plastic carrier layer and disposed and resting flat on a side of the reflective layer means remote from the transmission layer means.

12. An electrically dimmable rear-view mirror according to claim 11, further comprising
a second light sensor means responsive to the brightness of the surroundings generating an output signal which increases monotonically as the brightness of the surroundings decreases for controlling the sensitivity of the first light sensor means such that the output signal of the first light sensor means increases monotonically with the output signal from the second light sensor means.

13. An electrically dimmable rear-view mirror according to claim 1 further comprising
(PLZT) platelet means installed between the second polarizer and the transmission window means in the reflective layer means responsive to the electric field for effecting increased shifts in intensity of light striking said light sensor means.

* * * * *